United States Patent
Lang et al.

(10) Patent No.: US 9,595,412 B2
(45) Date of Patent: Mar. 14, 2017

(54) CONTROL PANEL INCLUDING SOLID-INSULATED PLUG-IN CONNECTION

(71) Applicant: Schneider Electric Industries SAS, Rueil-Malmaison (FR)

(72) Inventors: Franz Lang, Lappersdorf (DE); Gaetan Djenane, Montreal (CA); Rainer Stein, Regensburg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 14/674,279

(22) Filed: Mar. 31, 2015

(65) Prior Publication Data

US 2015/0279603 A1   Oct. 1, 2015

(30) Foreign Application Priority Data

Mar. 31, 2014   (DE) .................. 10 2014 104 541

(51) Int. Cl.
| | |
|---|---|
| *H01H 71/02* | (2006.01) |
| *H01H 69/00* | (2006.01) |
| *H02B 13/035* | (2006.01) |
| *H01H 71/08* | (2006.01) |

(52) U.S. Cl.
CPC .......... *H01H 71/025* (2013.01); *H01H 69/00* (2013.01); *H01H 71/08* (2013.01); *H02B 13/0356* (2013.01); *H02B 13/0358* (2013.01); *Y10T 29/49105* (2015.01)

(58) Field of Classification Search
CPC ...... H01H 71/025; H01H 71/08; H01H 69/00; H02B 13/0356; H02B 13/0358; H02B 11/04; H02B 11/12–11/173; H02B 11/22

USPC .................................................. 361/600–678
See application file for complete search history.

(56) References Cited

U.S. PATENT DOCUMENTS

| | | | |
|---|---|---|---|
| 6,242,708 B1 | 6/2001 | Marchand et al. | |
| 7,417,846 B2 * | 8/2008 | Arioka ................ | H02B 13/035 361/604 |
| 9,030,809 B2 | 5/2015 | Sabani et al. | |
| 9,153,390 B2 * | 10/2015 | Lammers ................ | H01H 1/40 |
| 2005/0219804 A1 | 10/2005 | Arioka | |
| 2013/0148268 A1 | 6/2013 | Sologuren-Sanches et al. | |
| 2013/0201607 A1 | 8/2013 | Meinherz et al. | |
| 2015/0083556 A1 | 3/2015 | Capelli et al. | |
| 2015/0357774 A1 * | 12/2015 | Ren ..................... | H01R 25/162 439/110 |

FOREIGN PATENT DOCUMENTS

| | | |
|---|---|---|
| AU | 2013201093 A1 | 9/2013 |
| CN | 202120805 U | 1/2012 |
| CN | 102427206 A | 4/2012 |
| CN | 202633810 U | 12/2012 |
| CN | 202797732 U | 3/2013 |
| DE | 40 01 192 A1 | 7/1991 |
| DE | 295 01 081 U1 | 3/1995 |
| DE | 198 09 839 A1 | 9/1999 |

(Continued)

*Primary Examiner* — Zachary M Pape
(74) *Attorney, Agent, or Firm* — Oblon, McClelland, Maier & Neustadt, L.L.P.

(57) ABSTRACT

A control panel for medium voltage or high voltage has a circuit breaker housing and a cable connector housing which can be connected in a current conducting manner via an external plug-in connection.

9 Claims, 3 Drawing Sheets

(56) References Cited

FOREIGN PATENT DOCUMENTS

Figure 1:
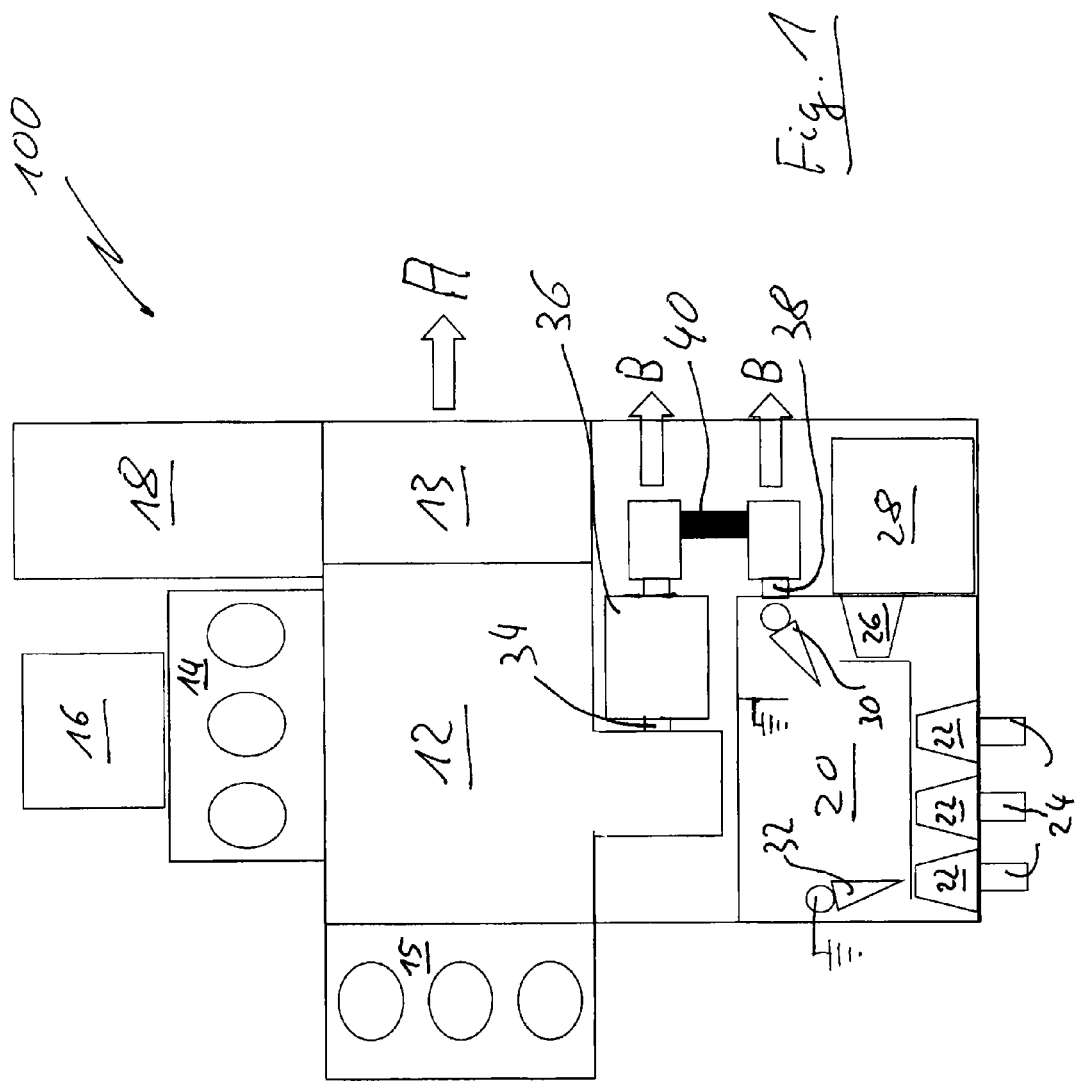

| | | |
|---|---|---|
| DE | 103 14 458 A1 | 10/2004 |
| DE | 600 10 520 T2 | 4/2005 |
| DE | 10 2005 029 600 A1 | 1/2006 |
| DE | 103 14 459 A1 | 10/2014 |
| EP | 0 563 535 A1 | 10/1993 |
| EP | 0 802 595 B1 | 7/2002 |
| EP | 2 634 869 A1 | 9/2013 |
| EP | 2 634 874 A1 | 9/2013 |
| FR | 2 987 490 A1 | 8/2013 |
| JP | 10-248127 A | 9/1998 |
| JP | 2011-120364 | 6/2011 |
| KR | 10-2013-0000620 | 1/2013 |

* cited by examiner

CONTROL PANEL INCLUDING SOLID-INSULATED PLUG-IN CONNECTION

The invention relates to a control panel for medium voltage or for high voltage having a circuit breaker arranged in a circuit breaker housing.

In known control panels of this type for switching plants, substantial disadvantages arise with the respect to the replaceability of components and switchgear, which result in larger interruptions to operation when necessary, in particular in the case of customary configurations having so-called inner cone cable connector systems: Current transformers (inductive toroidal transformers) which become defective in operation or which have to be recalculated and replaced as a result of changes in the grid cannot be replaced without dismantling the whole control panel in a complicated and/or expensive manner or replacing it completely.

There is a further disadvantage in the case of defects in the busbar region or circuit breaker region. It is necessary in this case to release the high-voltage connections of the control panel to the respective neighboring fields and in particular to disconnect all high-voltage cable connectors and to reconnect them again and to test the connector after the replacement of the complete control panel.

It is the underlying object of the invention to eliminate the disadvantages shown and substantially to improve the design of the control panels with respect to replaceability.

This object is satisfied by the features of the independent claims and in particular by a control panel for medium voltage or high voltage having a circuit breaker housing in which a circuit breaker is arranged and having a separate cable connector housing at which leadthroughs for cable connectors are provided, wherein a current-conducting connection between components in the two housings is formed by at least one solid-insulated plug-in connection which connects the two housings at the outside and which is respectively releasable from the outer side of the housing.

In accordance with the invention, two separate housings are thus provided, wherein current can be led from the cable connectors to the circuit breaker via at least one current-conducting connection between the housings. The current-conducting connection is configured as an external, solid-insulated plug-in connection which is provided at the outer side of the two housings and which is respectively releasable from the outer side of the housings.

A known and already tested control panel design can be used as the circuit breaker housing which can also comprise, in addition to the circuit breaker, disconnectors and grounding switches, one or more busbars as well as a customary leadthrough for outer cone cable connector systems.

The advantage is in this respect that no new parts have to be designed and the complete and above all expensive type tests thereby remain valid.

The operating interruptions on replacement or repair of a control panel can be substantially reduced by the solution in accordance with the invention since the cable connectors do not have to be disconnected from the cable connector housing. It is rather sufficient if only the solid-insulated plug-in connection between the cable connector housing and the circuit breaker housing is released, which is possible from the outside. Subsequently, the two housings are separated from one another electrically so that the remaining control panel with the circuit breaker housing can either only be opened or can also be completely replaced.

Advantageous embodiments of the invention are described in the description, in the drawing and in the dependent claims.

It can be advantageous if the solid-insulated plug-in connection is arranged either at the front at the control panel operating side or at the rear at the control panel rear side since in this case the individual control panels can be still be arranged next to one another in a row without problem and good accessibility is ensured.

In accordance with a further advantageous embodiment, the solid-insulated plug-in connection can be provided with at least one current transformer. In this embodiment, a current transformer can be replaced particularly simply in that namely only the plug-in connection is dismantled from the two housings and the current transformer is subsequently removed from the plug-in connection.

Alternatively or additionally, it can be advantageous if a leadthrough provided at the respective housing, e.g. for an outer cone plug-in connector, is provided with at least one current transformer. It is also not necessary to open the housings in this case, which is in particular of advantage when they are hermetically encapsulated.

Inductive toroidal current transformers are preferred as current transformers since they have exactly defined measurement classes in accordance with international standards, are in particular suitable in connections with protective devices for short-circuit monitoring of grids and are moreover able to be calibrated and to be offset. Whole current transformer packets comprising a plurality of current transformers are also understood under the designation "current transformer" which are arranged in a packet according to the different purposes of use.

The cable connector housing can In accordance with a further advantageous embodiment have leadthroughs for inner cone sockets for a connection of a voltage transformer and/or of grounding equipment. In this case, such a voltage transformer would again be arranged outside the cable connector housing (and also outside the circuit breaker housing) so that they do not have to be opened for a replacement of the voltage transformer.

In accordance with a further aspect of the present invention, a current transformer can be replaced in a control panel of the above-described type without the circuit breaker housing and/or the cable connector housing having to be opened. The circuit breaker can equally be removed from the control panel while all the cable connectors of the control panel remain connected.

A separate, hermetically encapsulated housing can be used as the cable connector housing. It can have the inner cone cable connector sockets required by the customer in the desired size and number per phase (e.g. four sockets of size 3). Instead of inner cone sockets, leadthroughs having an outer cone connector system are also conceivable.

The present invention is particularly suitable for hermetically encapsulated switchgear, that is, on the one hand, gas-insulated control panels which are filled with an insulating gas, e.g. SF6, or with dry air. However, all other suitable insulating gases are also conceivable, e.g. mixtures with air and suitable fluoroketones.

It is alternatively possible that the housings are closed in a fluid-tight manner and are filled with an insulating fluid or that a solid insulation is provided, e.g. epoxy resin, silicone or EPDM. It is understood that combinations hereof are also possible.

Furthermore, still further leadthroughs for inner cone sockets can optionally be provided for the connection of inductive voltage transformers, for the connection of test jack connectors for cable inspections or for the connection of separate, non-integrated grounding equipment.

The hermetically encapsulated housing can furthermore include a plurality of switchgear units, for example disconnectors and one or more grounding switches in order, for example, to satisfy demands form the North American area. The high-voltage connectors in the housing can be disconnected from the remaining control panel by the disconnector. The grounding switch in this respect serves the grounding of the disconnected connection in the direction of the control panel. A further grounding switch can optionally convert the high-voltage connectors to ground potential. Disconnect apparatus for the above-described voltage transformers can also be provided in the housing to disconnect the voltage transformers from the high-voltage conductors and to ground them.

The connection between the current-conducting components within the housings is carried out using a solid-insulated plug-in connection. Current transformers (e.g. inductive toroidal transformers or also so-called Rogowski coils) can in this respect be seated on leadthroughs with an outer cone connector system, wherein the leadthrough has a long cylindrical shaft for receiving the current transformers. The current transformers can, however, also be directly arranged at the solid-insulated plug-in connection, substantially at a vertical conductor section. This variant only requires short outer cone leadthroughs at the control panel since no current transformer has to be received at the leadthrough. It is advantageous in this respect that a larger number of current transformers can be received than in an arrangement directly on the outer cone leadthroughs which are in turn restricted in their length (extended, cylindrical shaft).

After the corresponding disconnection and grounding of the control panel connector region, the dismantling of the solid-insulated plug-in connection can be carried out simply, fast and without intervention in the remaining control panel. The separate cable connector housing having the optional switchgear equipment can thereby be disconnected from the remaining control panel.

If a defect case is present at the circuit breaker, the control panel with the circuit breaker can be taken out of the plant network after the release of the connections to the neighborhood control panels. It is advantageous in this respect that the complete cable connector system of the control panel with its multiple cable connectors per phase do not have to be disconnected and reconnected later. After the insertion of a new or repaired control panel, it is sufficient to reassemble the solid-insulated plug-in connection.

If a replacement of the current transformer at the control panel is necessary, it can be carried out simply after the dismantling of the solid-insulated plug-in connection. The current transformer can then be removed directly from the outer cone and replaced. If the current transformer is seated at the solid-insulated plug-in connection, only a part of the plug-in connection additionally has to be dismantled before the current transformer can be removed.

In the control panel designs in accordance with the prior art, interventions directly in the insulating gas space of the control panel would always be necessary in such a case. Since this process is associated with substantial effort, the control panel previously has to be disconnected from the plant network and can be removed.

The electric switchgear in which the control panel is used can be a three-pole switchgear. It is understood that the electrical switchgear can, however, also be of two-pole or single-pole design.

Figure 2:
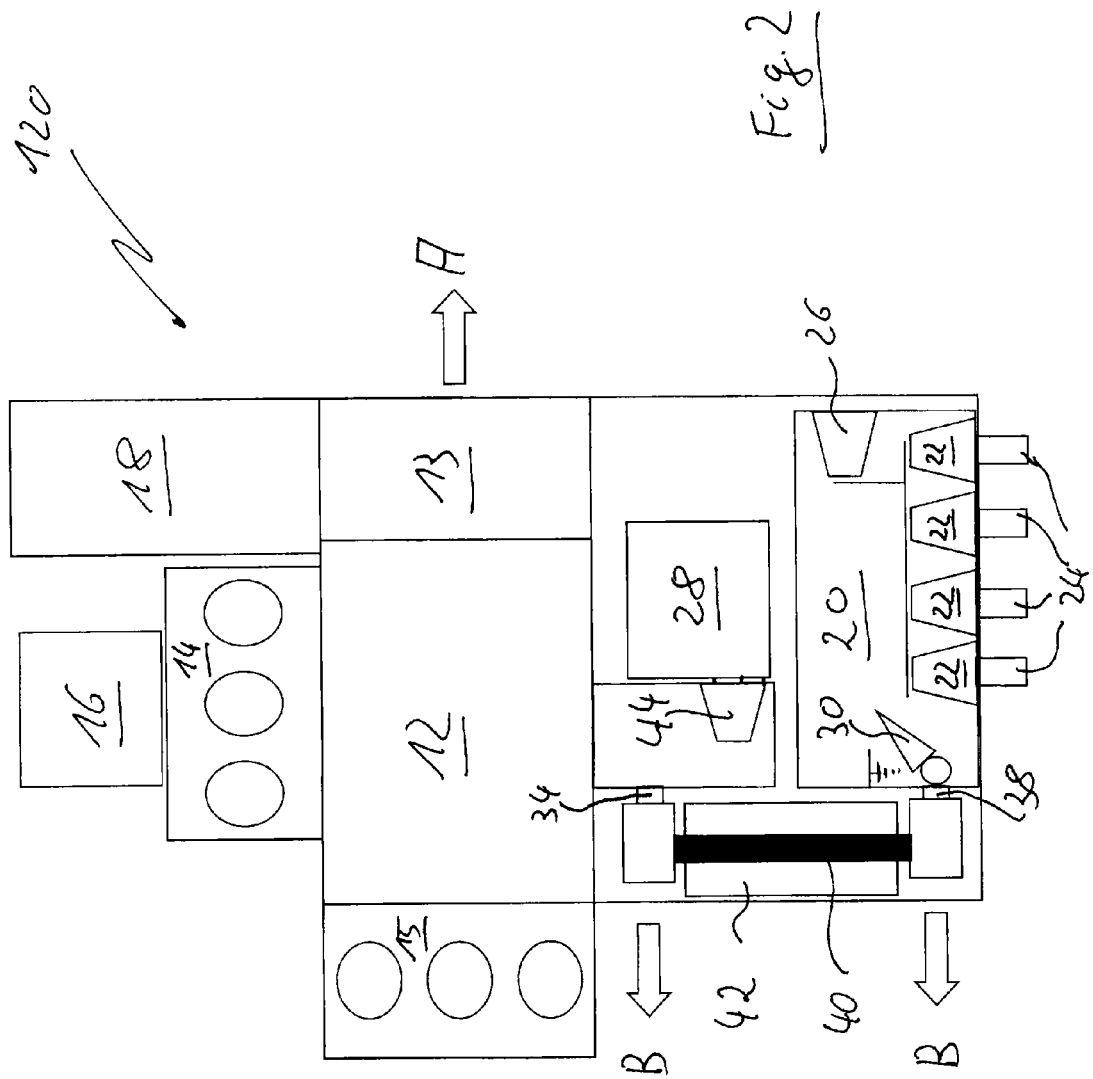

The present invention will be described in the following purely by way of example with reference to advantageous embodiments and to the enclosed drawings. There are shown:

FIG. 1 a schematic side view of a first embodiment of a control panel;

FIG. 2 a schematic side view of a further embodiment of a control panel; and

Figure 3:
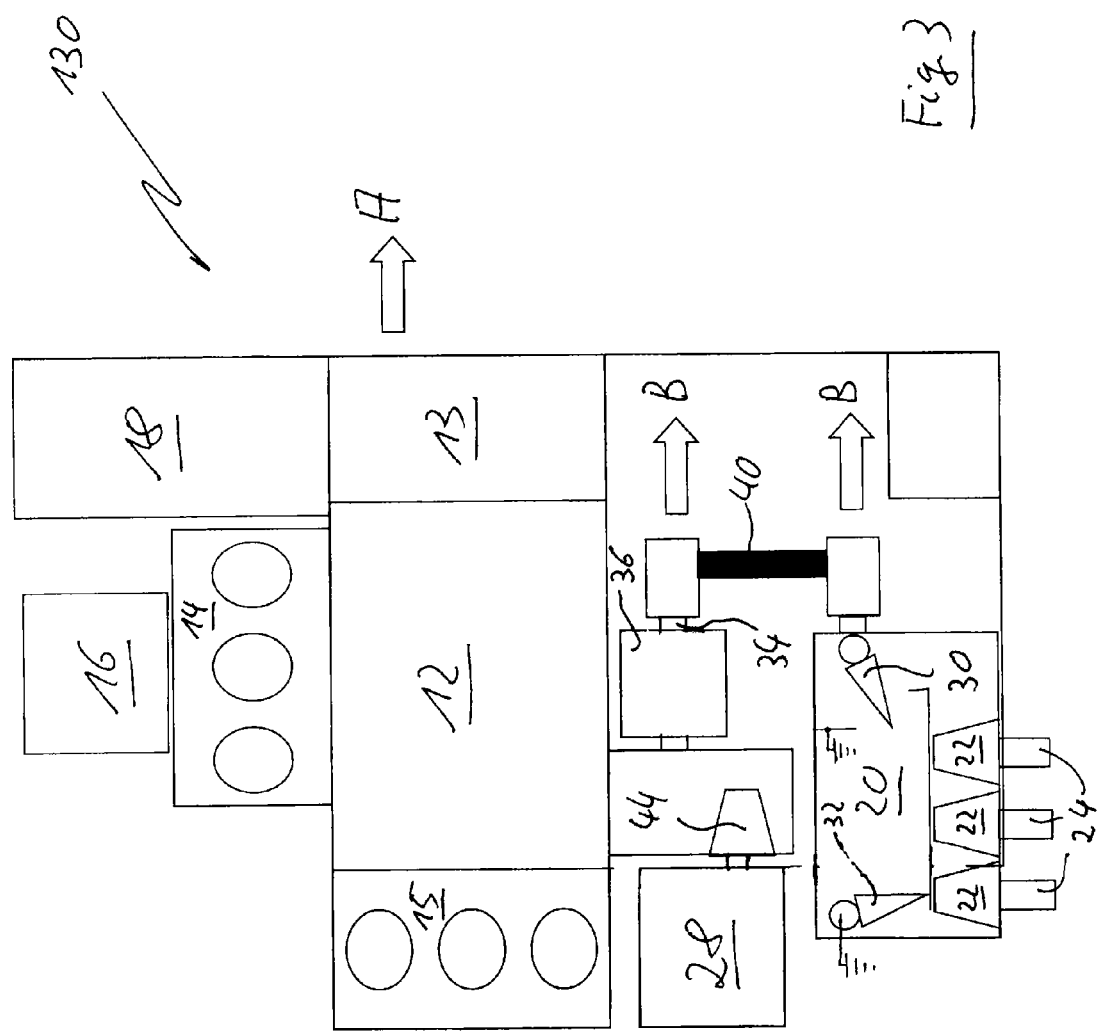

FIG. 3 the representation of a third embodiment of a control panel.

The same reference numerals will be used for the same components or construction elements or assemblies for the following description of advantageous embodiments.

In the control panel 100 for medium voltage or high voltage shown in FIG. 1, a circuit breaker housing 12 is provided which is hermetically encapsulated and filled with insulating gas in the embodiment shown and in which a circuit breaker (not shown) is arranged. Busbars are provided in a known manner in a busbar housing 14 at the upper side of the circuit breaker housing 12. A three-position switch, which is arranged in a manner not shown between the busbar and the circuit breaker, is additionally arranged in the busbar housing 14. Such three-position switches are known as rotary switches or push switches and have a disconnection function for disconnecting the electrical connection of busbar to circuit breaker and have a grounding function for a grounding of the control panel at the outlet side. A further busbar housing 15 can be arranged laterally at the circuit breaker housing 12. Pluggable voltage transformers 16 for every electrical phase can furthermore be provided at the upper side of the busbar housing 14.

The required mechanical drives for actuating the circuit breaker and the respective disconnectors and grounding switches are located in a drive housing 13.

A low-voltage switch cabinet 18 is arranged above the drive housing 13.

A cable connector housing 20 is provided in the lower region of the control panel 10 shown in FIG. 1; said cable connector housing is formed separately from the circuit breaker housing 12, i.e. is a separate and likewise hermetically encapsulated cable connector housing, and three leadthroughs 22 are provided in it for cable connectors 24 as well as a further leadthrough 26 for a voltage transformer 28 provided outside the cable connector housing 20. In the embodiment shown, the leadthroughs 22 and 26 are formed as inner cone sockets.

An optional three-position switch 30 and an optional grounding switch 32 are furthermore located within the cable connector housing 20. The three-position switch 30 is shown as a rotary switch and has a disconnection function for disconnecting the electrical connection between the cable connectors 24 and the plug-in connector 40. The leadthrough 38 can be grounded by the grounding function so that the plug connector 40 can be dismantled without danger.

The optional grounding switch 32 serves for grounding the cable connectors 24 as required.

As FIG. 1 further illustrates, the circuit breaker housing 12 has a leadthrough 34; for an outer cone connector system in the example shown, and a current transformer 36 is connected to said leadthrough outside the housing 12. The cable connector housing 20 is equally equipped with a leadthrough 38 for an outer cone connector system. In this manner, a current-conducting connection between components in the two housings 12 and 20 can be formed by an external plug-in connection 40 which is configured in accordance with the invention as a solid-insulated busbar connection having connector adapters for the outer cone connector system and connects the two housings 12 and 20 to one another at the outside. In this respect, the solid-insulated plug-in connection 40 can be released both from the leadthrough 34 of the circuit breaker housing 12 and from the leadthrough 38 of the cable connector housing 20 from the outer side of the housings so that said plug-in connection can be removed in the direction of the arrows B after a release of the connection.

The circuit breaker housing 12 first has to be switched currentless for a repair or a replacement of the control panel and in particular of the circuit breaker in the circuit breaker housing. The three-position switch 30 in the cable connector housing 20 can equally be actuated such that the plug-in connection 40 is currentless. Subsequently, after the release of the electrical and mechanical connections to the respective neighboring fields and after the removal of the solid-insulated plug-in connection 40, the remaining control panel with the circuit breaker housing 12 can be opened for a repair or for a replacement of the circuit breaker without the interior of the cable connector housing 20 having to be opened in so doing or without the cable connectors 24 having to be dismantled.

The control panel 120 shown in FIG. 2 essentially differs from that of FIG. 1 in that the solid-insulated plug-in connection 40 is arranged at the rear at the control panel rear side and is moreover provided with a current transformer 42 which is thus also located outside the housings 12 and 20. The voltage transformer 28 is furthermore not connected to the inner cone leadthrough 26 of the cable connector housing 20, but rather to an inner cone leadthrough 44 of the circuit breaker housing 12. In this manner, the two housings 12 and 20 can remain completely closed on a defect of either the current transformer 42 or of the voltage transformer 28. It is only necessary for a replacement of the current transformer 42 that the plug-in connector in the leadthrough 34 and/or the plug-in connector in the leadthrough 38 is released and that the solid-insulated plug-in connection 40 is dismantled so that the current transformer 42 can be removed.

FIG. 3 shows an arrangement of a control panel 130 similar to FIG. 1 in which the solid-insulated plug-in connection 40 can be removed from the front side of the control panel in the direction of the arrows B. In this embodiment, the voltage transformer 28 is arranged at the control panel rear side and is guided via an inner cone leadthrough 44 into the interior of the circuit breaker housing 12.

The invention claimed is:

1. A control panel for medium voltage or high voltage comprising:
    a circuit breaker housing comprising a circuit breaker;
    a separate cable connector housing that provides leadthroughs for cable connectors;
    a current-conducting connection between components in the circuit breaker housing and the cable connector housing which is formed by at least one solid-insulated plug-in connection and a current transformer;
    wherein the current-conducting connection connects respective outer sides of the circuit breaker housing and of the cable connector housing and is releasable from the respective outer sides of the circuit breaker housing and of the cable connector housing, the current transformer directly connected to the outer side of the circuit breaker housing.

2. The control panel in accordance with claim 1, wherein the solid-insulated plug-in connection is respectively connected to the circuit breaker housing or the cable connector housing via an outer cone leadthrough.

3. The control panel in accordance with claim 1, wherein the solid-insulated plug-in connection is arranged either at the front of a control panel operating side or at the rear of a control panel rear side.

4. The control panel in accordance with claim 1, wherein the cable connector housing has at least one inner cone leadthrough for a connector of a voltage transformer or of grounding equipment.

5. The control panel in accordance with claim 1, wherein the cable connector housing has switchgear for disconnecting and grounding.

6. The control panel in accordance with claim 1, wherein the cable connector housing is hermetically encapsulated.

7. The control panel in accordance with claim 6, wherein the circuit breaker housing is also hermetically encapsulated.

8. A method of replacing a current transformer in a control panel having a circuit breaker housing in which a circuit breaker is arranged and having a separate cable connector housing at which leadthroughs for cable connectors are provided, wherein a current-conducting connection between components in the circuit breaker housing and the cable connector housing is formed by at least one solid-insulated plug-in connection and the current transformer, the current-conducting connection connects respective outer sides of the circuit breaker housing and of the cable connector housing, the current transformer being directly connected to the outer side of the circuit breaker housing, the method comprising:
    releasing the solid-insulated plug-in connection from at least one of the respective outer sides of the circuit breaker housing and the cable connector housing;
    replacing the current transformer after releasing the solid-insulated plug-in connection without opening the circuit breaker housing and the cable connector housing.

9. A method of replacing a current transformer in a control panel having a circuit breaker housing in which a circuit breaker is arranged and having a separate cable connector housing at which leadthroughs for cable connectors are provided, wherein a current-conducting connection between components in the circuit breaker housing and the cable connector housing is formed by at least one solid-insulated plug-in connection and the current transformer, the current-conducting connection connects respective outer sides of the circuit breaker housing and of the cable connector housing, the current transformer being directly connected to the outer side of the circuit breaker housing, the method comprising:
    releasing the solid-insulated plug-in connection from at least one of the respective outer sides of the circuit breaker housing and the cable connector housing;
    replacing the current transformer after releasing the solid-insulated plug-in connection without opening the circuit breaker housing and the cable connector housing, wherein, in the releasing and the replacing, all the cable connectors remain connected in the cable connector housing and the cable connector housing is not dismantled.

* * * * *